United States Patent [19]
Schroder

[11] 3,869,671

[45] Mar. 4, 1975

[54] METHOD OF AND CIRCUIT ARRANGEMENT FOR OPERATING A CONTROL-SIGNAL TRANSMITTER FOR REMOTE-CONTROL EQUIPMENT

[75] Inventor: Wolfgang Schröder, Pforzheim, Germany

[73] Assignee: International Standard Electric Corporation, New York, N.Y.

[22] Filed: Mar. 27, 1973

[21] Appl. No.: 345,378

[30] Foreign Application Priority Data

Apr. 10, 1972 Germany............................ 2217124

[52] U.S. Cl....... 325/118, 178/DIG. 15, 200/DIG. 1, 200/DIG. 2, 325/37, 325/392, 331/65, 340/258 C, 343/228

[51] Int. Cl......................... H04b 11/00, H04b 1/04

[58] Field of Search ........... 325/105, 111, 155, 392, 325/37, 118, 119; 178/DIG. 15, 5.8 R; 343/225, 228; 340/258 C, 258 D; 331/65, 185; 307/116; 200/DIG. 2, DIG. 1; 334/15

[56] References Cited

UNITED STATES PATENTS

| | | | |
|---|---|---|---|
| 3,666,988 | 5/1972 | Bellis | 307/116 |
| 3,737,670 | 6/1973 | Larson | 200/DIG. 2 |

*Primary Examiner*—Richard Murray
*Assistant Examiner*—Marc E. Bookbinder
*Attorney, Agent, or Firm*—John T. O'Halloran; Menotti J. Lombardi, Jr.

[57] ABSTRACT

A battery-powered control signal transmitter for remotely controlling equipment such as television receivers is provided. A remote-control transmitter is of the finger-touch type wherein different control functions, such as channel switching, volume, brightness, and the like are controlled via finger-touch electrodes rather than mechanical operational control.

17 Claims, 3 Drawing Figures

Figure 1:
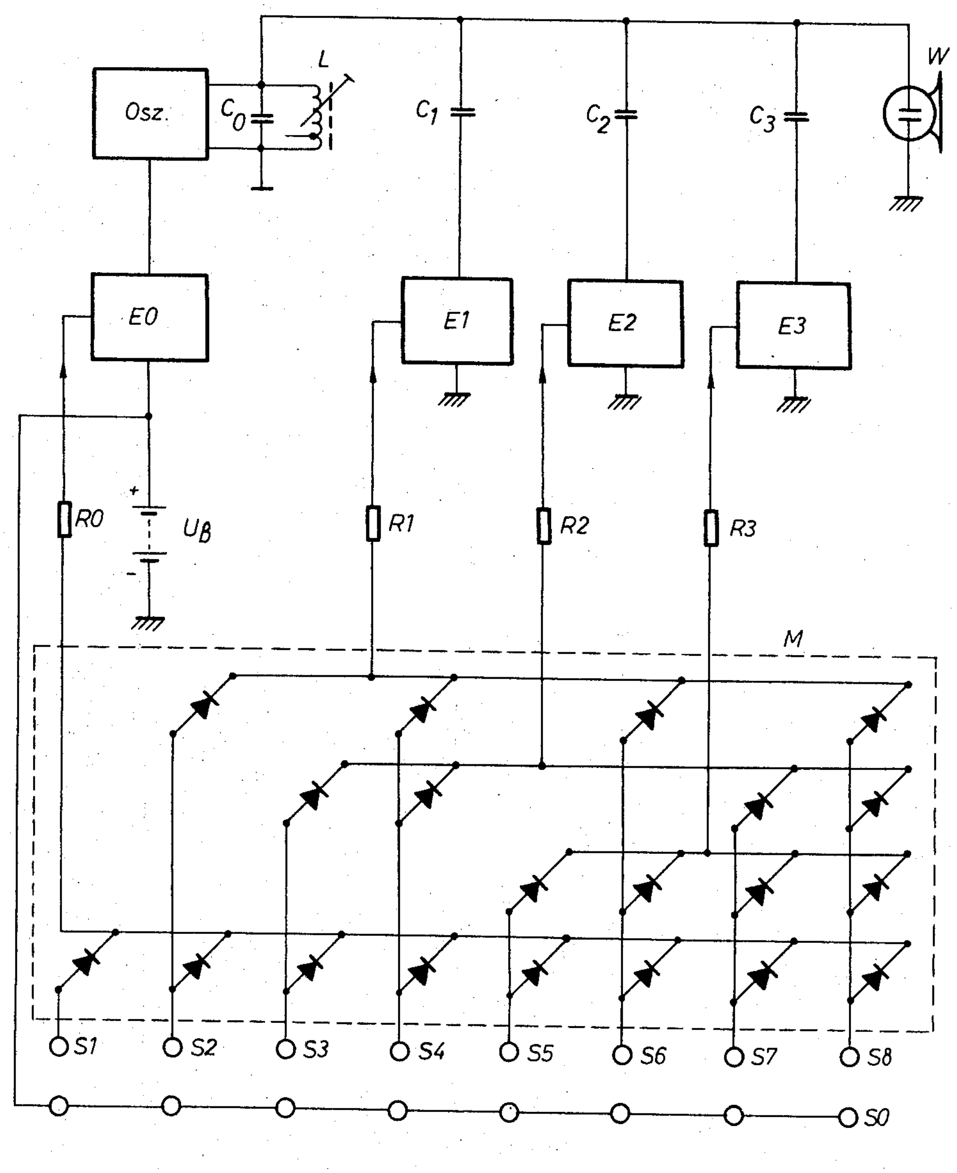

METHOD OF AND CIRCUIT ARRANGEMENT FOR OPERATING A CONTROL-SIGNAL TRANSMITTER FOR REMOTE-CONTROL EQUIPMENT

The present invention relates to control-signal transmitter for remote-control equipment.

Such remote-control equipment is used, for example, with television and radio sets, model airplanes and ship models, toys, garage doors, etc. In color television sets, for example, the following control functions can be remotely controlled: channel selection by switching to different television channels of different television bands, volume, brightness, contrast, color saturation, hue.

The purpose of the invention is to replace, as far as possible, all of the control-signal transmitter's control elements, which presently must still be operated mechanically, by electronic circuits controlled via finger-touch electrodes.

Today the control-signal transmitters for remote-control equipment are still equipped with control elements to be operated mechanically because the problem of the operating voltage supply of finger-touch circuits from the weak battery of such control-signal transmitters had yet to be solved. Only for the units to be remotely controlled are there such devices which are permanently mounted in the unit and are fed from the mains.

It is the object of the present invention to make the technique of the finger-touch electrodes suitable for battery-powered control-signal transmitters of remote-control equipment, preserving the known advantages.

The invention is characterized in that the control signals to be transmitted by the control-signal transmitter are triggered at finger-touch electrodes by the finger of the operator, and that the finger-touch electrodes (instead of control elements to be operated mechanically) are part of the control-signal transmitter.

The inventive circuit is characterized in that the finger-touch electrodes or their following circuit arrangement are connected to an electrical matrix circuit which consists of a diode gate, and that, in known manner, the diode combination is connected so that frequencies, modulations, pulses and/or capacitors, resistors and/or coils are added together for generating coded control signals which are triggered by touching one electrode simultaneously with its counter electrode.

Another embodiment of the invention is characterized in that electronic switches are provided which consist of the inverse-parallel connection of a diode and the main-electrode path of a transistor or thyristor whose control electrode is connected, via one or more amplifier and/or decoupling elements or directly, to the associated finger-touch electrode or to the matrix circuit.

A further embodiment of the invention is characterized that the transistor or thyristor connected inverse parallel to the diode is of a conductivity type opposite to that of the transistor or thyristor for switching the oscillator, and that the indirectly or directly associated electrode of the finger-touch electrodes are connected directly or indirectly to the control electrode of one conductivity type, while the counter electrode of the finger-touch electrodes is connected directly or indirectly to the control electrode of the other conductivity type, with the reference potential of one conductivity type connected to the positive terminal of the battery and that of the other conductivity type to the negative terminal of the battery, so that the touch current across the electrode flows as turn-on current (control current, base current) from the battery via the first control path (emitter-base path) of one conductivity type, via the finger-bridged touch path between the electrode and counter electrode of the finger-touch electrodes, and via the second control path (base-emitter path) of the other conductivity type back to the battery.

The principal advantage achieved by the invention is that the sensor technique for the control elements of radio and television tuners can be made suitable for the control elements of control-signal transmitters for the remote control of radio and television sets. The control-signal transmitter, e.g. an ultrasonic-control-signal transmitter, can be brought to a great number of control frequencies (e.g. eight). Further advantages are that the signal transmitter must be powered only by a small battery, and that current is consumed only during signalling. Other advantages of the circuit are that the oscillating voltage can rise up to the permissible voltage limit and, after smaller values, is limited by the residual-voltage drops across the semiconductors. For smaller voltages, the diode may be a germanium type, for example. Compared with the known switching diodes, the switching-current requirement is only a fraction. Complementary semiconductors may be used, too.

Figure 2:
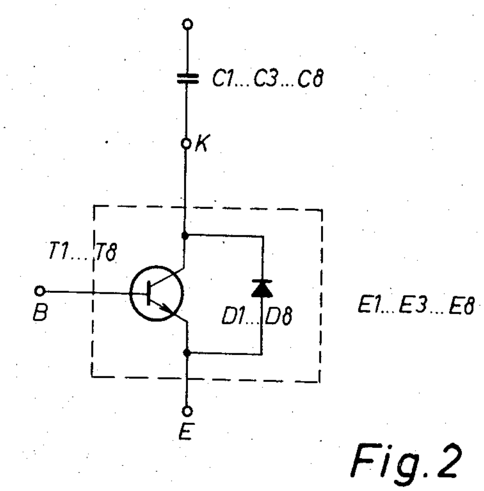
Figure 3:
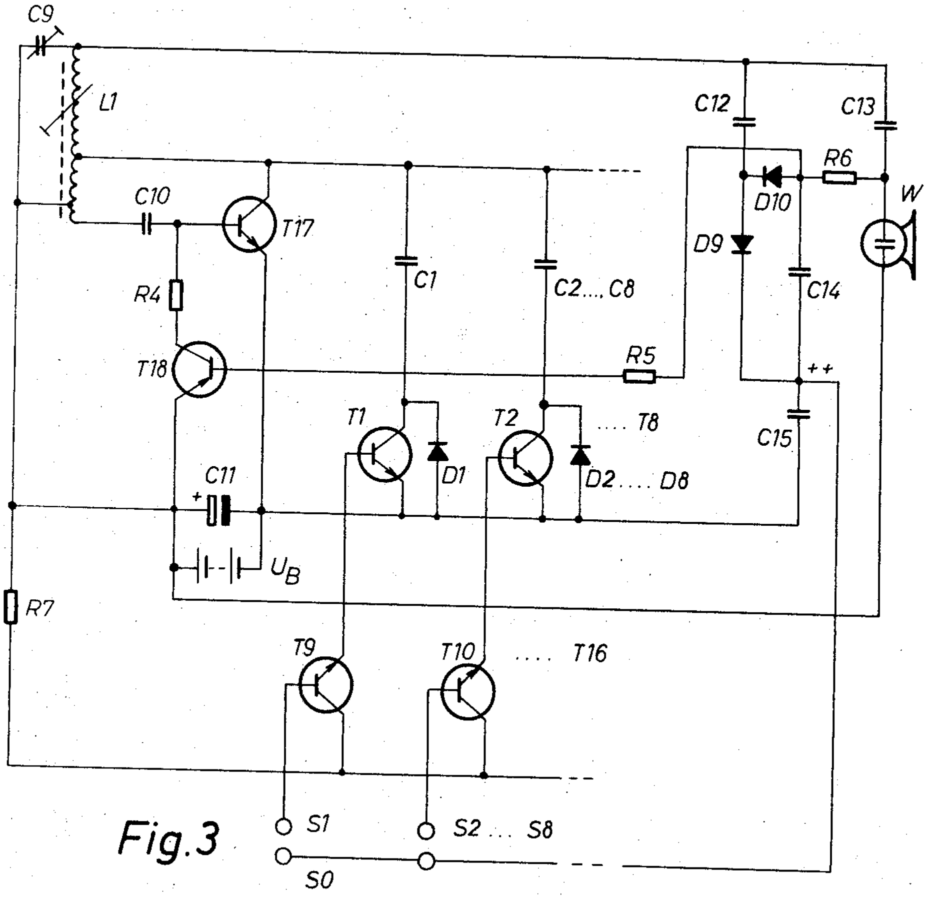
Figure 1:
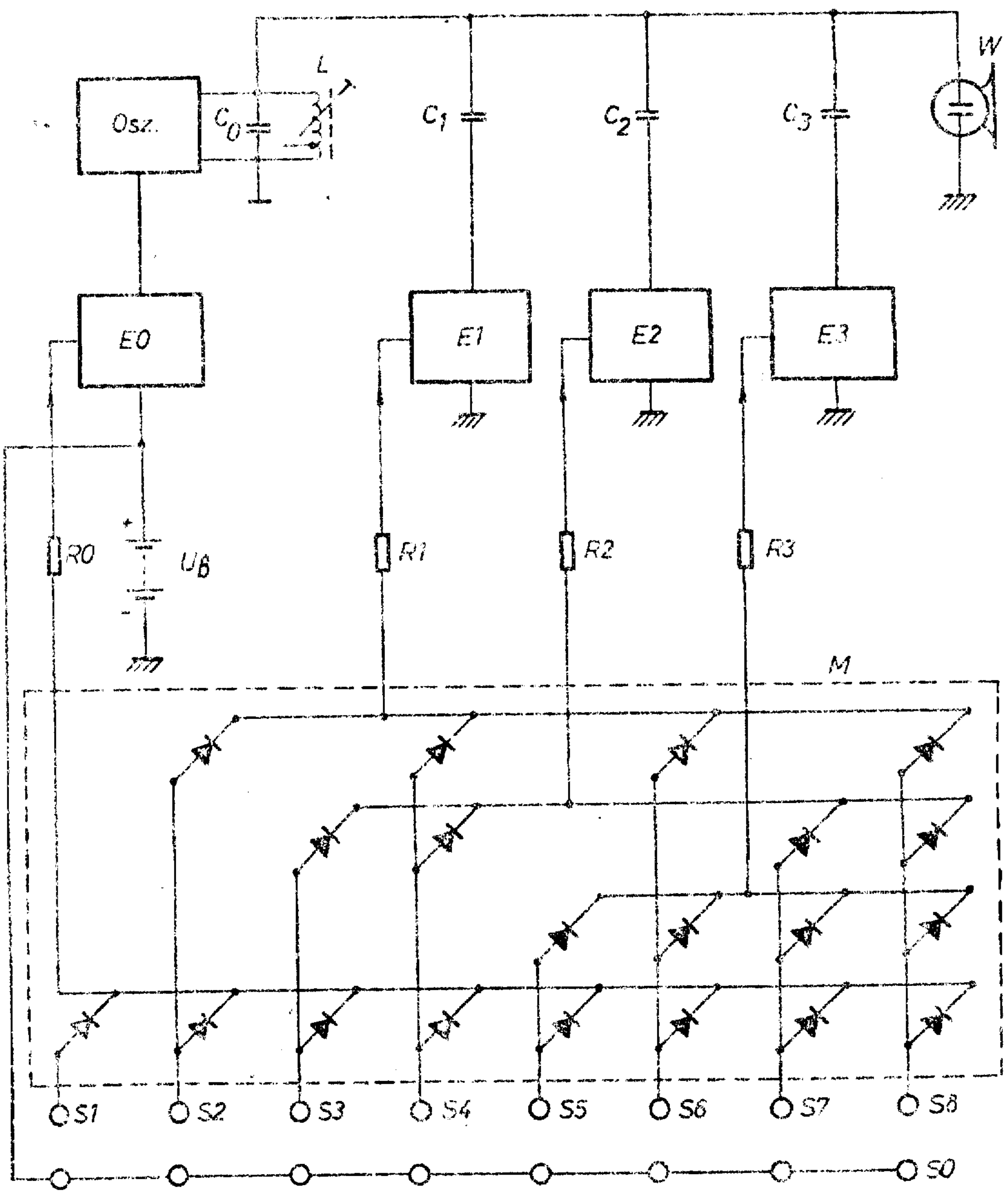

Embodiments of the invention are illustrated in the accompanying drawings and will now be described in more detail. In the drawing, FIG. 1 is a block diagram serving to explain the method according to the invention;

FIG. 2 shows the schematic circuit diagram of the electronic switches used, according to the invention, in the a.c. circuits, and FIG. 3 shows another embodiment of the invention.

The control-signal transmitter shown in FIG. 1 has, for example, a transistor oscillator Osz., which also feeds the electroacoustic transducer W. The oscillator operates with its resonant circuit $LC_o$ on its fundamental frequency $f_o$ as soon as the battery supplies the operating current via the electronic switch EO. With the electronic switches E1, E2, and/or E3 and with the capacitors C1, C2, and/or C3, individually or in combination, the resonant circuit can be tuned to a total of eight different frequencies if one of the electrodes S1...S8 and its counter electrode is touched with the finger. The frequency $f_o$ is generated if none of the three capacitors C1...C3 is switched into circuit. The diode matrix M, connected via resistors R1, R2, R3, R0, combines the capacitance values to be added. The electronic switch EO of the oscillator is turned on with each of the electrodes S1...S8.

Component savings can be achieved if the finger-touch electrodes or their following circuit arrangement are/is connected to an electrical matrix circuit which may consist of a diode gate with a diode combination which is connected, in known manner, so that frequencies, modulations, pulses and/or capacitors, resistors and/or coils are added for generating coded control signals which are triggered by touching one electrode simultaneously with its counter electrode.

For the wireless remote control of radio and television receivers, toys, and garage doors, ultrasonic communication is commonly employed. For this application, the electrical signals of the control-signal transmitter are therefore fed to an electroacoustic transducer, preferably an ultrasonic transducer, for acoustic radiation.

However, the electrical signals of the control-signal transmitter may also be applied to a light source, e.g. also to an infrared source, if the remote-control receiver is suitably equipped.

For the command guidance of model airplanes and ship models, ultra-short waves are used; here, the electrical signals of the control-signal transmitter must be radiated electromagnetically. Finally, capacitive or magnetic transmission of the signals is possible.

The oscillator Osz. of the control-signal transmitter, operated from the electrical battery $U_B$ (or from another energy converter), is appropriately connected in series with the main-electrode path of an electronic switch EO, which is, for example, a transistor or a thyristor, or the like. In this case, the control electrode of the transistor or thyristor is connected indirectly or directly to one or more of the finger-touch electrodes S1...S8, to the counter electrode, or to the matrix circuit (diode gate) M, connected to the electrodes.

However, the arrangement may also be such that less control current is required for the electronic switch than with a matrix circuit. To accomplish this, the circuit may be modified in such a manner that the main-electrode path of the electronic switch EO (transistor, thyristor, or the like) is connected in series with the resistor at the control electrode of the oscillator Osz., so that the oscillator oscillates only while the electronic switch is on.

For switching the control-signal transmitter to different control frequencies, the capacitors, resistors, and/or coils for coding the signals of the control-signal transmitter, e.g. for tuning to different control frequencies, are connected via the main-electrode paths of the electronic switches E1, E2, E3 to the resonant circuit $LC_0$ of the oscillator Osz., with the control electrodes of the electronic switches E1, E2, E3 connected indirectly or directly to one or more of the finger-touch electrodes S1...S8, S0, to the counter electrode, or to the matrix circuit (diode gate) M, connected to the electrodes.

The control-signal generator may also contain several oscillators which are independent of or dependent on each other and can be started separately or in combination via the associated electronic switches or via the matrix circuit.

If a major amplification of the touch currents is necessary behind the finger-touch electrodes, a preamplifier should be inserted between the matrix M and each of the finger-touch electrodes S1...S8. By inserting preamplifiers between the matrix M and the electronic switches E1...E3, one can save on amplifier elements but, in the matrix circuit, must use diodes with extremely low reverse currents and employ elaborate preamplifiers.

An inventive embodiment of the electronic switches E1...E8 which can be used to advantage in all kinds of a.c. circuits and particularly also in receiver circuits is shown in FIG. 2. The inverse-parallel connection of the collector-emitter path K - E of the transistor T1 with the diode D2 is connected in series with the frequency-determining capacitor C1...C8 and switched into the resonant circuit. The emitter E may be connected to the reference potential to which the base current is to flow with which the transistor is switched.

When the base B is open, a blocking charge immediately builds up on the capacitor C1 from the oscillating voltage due to the rectifying effect of D1, so that no current flows through the inverse-parallel connection. As soon as a direct current is sent over the base-emitter path B – E of the transistor T1, the blocking charge on the capacitor C1 will collapse across the conducting collector-emitter path. The inverse-parallel connection now operates as a bipolar switch.

This circuit has the following advantages. The resonant-circuit voltage can rise to the permissible voltage limit of the semiconductors employed, and after small values it is limited by the residual-voltage drops across the semiconductors. For lower voltages, the diode may be a germanium type, for example. The switching-current requirement is only a fraction of that of the known switching diodes. Complementary semiconductors may be employed, too.

FIG. 3 shows a circuit diagram of an inventive embodiment of a tried control-signal transmitter for the ultrasonic remote control of radio and television sets. The base of transistor T17 is connected, through coupling capacitor C10, to the resonant-circuit coil L1. This coil has as its basic capacity the electroacoustic transducer W, which radiates the desired ultrasonic frequencies. C13 is connected in series with the transducer capacitance and insures the galvanic decoupling of the polarizing voltage to be fed into the electrostatically operating transducer. C13 may also be used for the coarse alignment of the transducer capacitance, while the trimmer capacitor C9 is used for the fine alignment of the basic capacity.

The collector of transistor T17 is connected to one tap of the coil L1, and the ultrasonic transducer is connected to the upper end of the coil, thereby receiving the stepped-up resonant-circuit voltage. In this portion, the circuit corresponds to the conventional arrangements for oscillators of this kind.

The rectified peak voltage is generated via the capacitors C12 and C15 and via the diodes D9 and D10 and stored on the charging capacitor C14. Since this voltage is also used to amplify the touch current, it is derived galvanically independent of the battery potential, and its negative terminal is connected via the high-value decoupling resistor R6 to the electrostatic-acoustic transducer W. Only when the electrodes S0 – S1...S8 are touched with the finger is the positive terminal of the polarization voltage connected via the finger's skin and the base-emitter paths of transistors T9 and T1 (or T10 and T2, T11 and T3, etc.) to the negative terminal of the battery, so that the polarization voltage becomes effective across the transducer W.

By means of the inverse-parallel connection of the transistors T1...T8 with the diodes D1...D8, explained hereinbefore with reference to FIG. 2, the capacitors C1 to C8 can be parallel-connected as frequency-changing resonant-circuit capacitance between the collector of transistor T17 and the negative terminal of the battery $U_B$ if the finger-touch electrodes S1...S8 are bridged with the finger to the common electrode SO. The common counter electrode may S0. form the shield for the entire control-signal transmitter or a part thereof. The touch current is amplified by the transistors T9...T16 and applied to the respective base-emitter paths of the transistors T1...T8.

The circuit is particularly advantageous if the transistors or thyristors T1...T8, connected inverse parallel to the diodes D1...D8, are of a conductivity type (NPN or PNP) opposite to that of transistor (or thyristor) T18 for switching the oscillator transistor T17. Thereby, as will be described below in more detail, the indirectly or directly associated finger-touch electrodes can be connected directly or indirectly to the control electrode of one conductivity type, while the counter electrode can be connected directly or indirectly to the control electrode of the other conductivity type. In this manner, the reference potential of one conductivity type may be connected to the positive terminal of the battery, and that of the other conductivity type to the negative terminal of the battery, so that the touch current as the turn-on current (control current, base current) flows from the battery via the first control path (emitter-base path) of one conductivity type, via the touch path between electrode and counter electrode, and via the second control electrode (base-emitter path) of the other conductivity type back to the battery.

For starting the oscillator, the touch current is sufficient; when the electrodes are touched, it takes the following course: from the positive terminal of the battery $U_B$ via the emitter-base path of transistor T18, via resistor R5, diodes D10, D9, the common electrode S0, the counter electrodes S1... or S8, the base-emitter paths of transistors T9, T10... or T16, the base-emitter paths of transistors T1, T2... or T8 to the negative terminal of the battery $U_B$. This current, flowing via the skin of the touching finger, causes transistor T18 to conduct, and current flows via the base resistor R4 into the oscillator transistor T17, which starts oscillating.

The oscillating voltage is rectified with the diodes D9 and D10 and charges the charging capacitor C14, whose voltage is then added to the battery voltage and, via the path described above, amplifies the touch current in such a manner that the respective associated inverse-parallel connection, too, safely conducts and tunes the oscillator to the associated signal frequency.

As soon as the finger is removed from the electrodes, the base-current flow in the oscillator transistor T17 ceases; the oscillation stops, and the circuit is currentless again.

The advantage of the circuit explained above lies in the operational comfort provided by the effortless, wear-free, and noiseless switching operations as has been impossible with battery-powered control-signal transmitters so far.

The battery-current requirement is considerably lower than in the arrangement with the diode matrix as shown in FIG. 1 because only two electronic switches must in each case be turned on simultaneously, which, because of the series connection of both base-emitter paths, require only the low common control current.

To exclude corrosion, the finger-touch electrodes and/or the shielding case are/is preferably made entirely or partially of chromium-plated metal and/or of conductive plastics.

The insulating creepage or air path between all or part of the electrodes and the counter electrodes is chosen to be so large that any bridging touch by insects is rendered difficult or impossible.

By separating depressions or elevations of the case surface of the control-signal transmitter, any unintentional bridging of electrodes and counter electrodes not associated with each other can be prevented.

The influence of deposits of moisture is eliminated by the fact that all those conductors on the circuit-carrying printed board on which a conducting moisture film results in an electronic switch being turned on are surrounded, at an insulating distance and, as far as possible, without a gap, with such conductors or conducting surfaces which are connected to a potential cutting the electronic switches off.

Likewise, the finger-touch electrodes and counter electrodes are designed so as to be surrounded on their insulating creepage paths, as far as possible without a gap, by one or two conductors which are insulated from each other and are each connected to a potential which, at the occurrence of conducting moisture films, cuts off the electronic switch connected to the adjacent electrode, with the conductors between the finger-touch electrodes fitted so deep that they cannot be touched with the finger.

To make better use of the little loaded battery of the control-signal transmitter, the battery may be simultaneously connected to a transistor radio receiver which is operable independent of the control-signal transmitter and united therewith in one and the same cabinet. In this case, the radio receiver should have a built-in VHF and/or ferrite antenna. The radio receiver combined with the control-signal transmitter may also be equipped, additionally or only, for receiving the sound channels of the frequency ranges of a television receiver.

It is also very advantageous to combine the control-signal transmitter with a clock in a common case because radio and television sets are mostly operated at a certain time. The clock may also have an alarm device, which also may turn on the radio receiver and may be operated from the battery of the control-signal transmitter; it may also operate digitally.

Furthermore, the clock may be a time switch or may be provided with a switching device which, via control signals and at preselected times, turns the set to be remotely controlled on and/or off.

The control-signal transmitter may also be made as a flashlight whose bulb is powered by the same battery or by a booster battery and may be turned on with a finger-touch electrode.

The control signals may be used to remotely control both a television set and a radio set with largely the same function assignment of the electrodes but, if necessary, with a different, switchable code for certain functions such as the turn-on and/or -off of the operating-current supply of the receivers to be remotely controlled.

What is claimed is:

1. A control signal transmitter for remote control equipment, comprising:

control signal generating means for providing a control signal;

at least one control element associated with said control signal generating means for controlling the frequency of the control signal when connected thereto;

power source;

electronic switch means, having a control input, for connecting the power source to the control signal generating means in response to a signal received at the control input;

further electronic switch means, having a control input, for operatively connecting the control element to the control signal generating means in response to a signal received at the control input of the further electronic switch means;

touch control switch means for connecting the power source to the control inputs of the electronic switch means and the further electronic switch means for providing a signal thereto so that the control signal generating means is activated and the control element is connected to the signal generating means to provide a predetermined control signal frequency;

means for rectifying the control signal; and a capacitor connected to the rectifying means to be charged by the rectified control signal, said capacitor forming an additional voltage source for providing control and operating voltage for the electronic switch means.

2. A control signal transmitter as described in claim 1, additionally comprising an electrostatic sound transducer connected to the capacitor so that said capacitor source provides a polarization voltage for the electrostatic sound transducer.

3. A control signal transmitter as described in claim 1, wherein the capacitor is connected in series with the power to provide additional control voltage so that the current to the electronic switch means is increased.

4. A control signal transmitter for remote control equipment, comprising:

control signal generating means for providing a control signal;

a plurality of control elements associated with said control signal generating means for controlling the frequency of the control signal when connected to said control signal generating means;

power source;

electronic switch means, having a control input, for connecting the power source to the control signal generating means in response to a signal received at the control input;

a plurality of further electronic switch means, each having a control input, for operatively connecting control elements to the control signal generating means in response to signals received at the control inputs of the further electronic switch means; and a predetermined number of touch control switch means for connecting the power source to the control input of the electronic switch means and to the control inputs of predetermined combinations of the further electronic switch means for providing a signal to the control inputs so that the control signal generating means is activated and a predetermined combination of control elements are connected to the control signal generating means so that a different predetermined control signal frequency is produced for each of the touch control switch means.

5. A control signal transmitter as described in claim 4, wherein the touch control switch means each comprise a pair of spaced electrodes, one electrode connected to the power source and the other electrode to the control input of the electronic switch means and the control inputs of the predetermined combination of the further electronic switch means, said electrodes being spaced so that a finger may bridge the electrodes and provide a current path thereby effectively closing the switch.

6. A control signal transmitter as described in claim 4, additionally comprising a diode matrix circuit for connecting each touch control switch means to the control input of the electronic switch means and the control inputs of the predetermined combinations of the further electronic switch means.

7. A control signal transmitter as described in claim 4, wherein each control element has a corresponding further electronic switch means and a corresponding touch control switch means so that touching a touch control switch means causes the corresponding control element to be connected to the control signal generator so that a predetermined control signal frequency is provided.

8. A control signal transmitter as described in claim 4, wherein the means for transmitting said control signal comprises an ultrasonic transducer for acoustic radiation.

9. A control signal transmitter as described in claim 4, wherein the control elements comprise capacitors connected by the further electronic switch means to the control signal generating means for tuning the control signal generating means to provide a control signal having a predetermined frequency.

10. A control signal transmitter as described in claim 9, wherein a diode matrix circuit connects each touch control switch means to the control input of the electronic switch means and the control inputs of the predetermined combinations of the further electronic switch means.

11. A control signal transmitter as described in claim 9, wherein each capacitor has a corresponding further electronic switch means and a corresponding touch control switch means so that touching a touch control switch means causes a predetermined control signal frequency to be provided.

12. A control signal transmitter as described in claim 4, wherein the further electronic switch means comprises a transistor having a control electrode connected to the touch control switch means and a diode connected between the collector and emitter of the transistor and orientated to provide a current flow opposite the current flow through the transistor.

13. A control signal transmitter as described in claim 4, wherein the electronic switch means and the further electronic switch means each comprise complementary transistor types and the touch control switch means connects the control electrode of the electronic switch means to the control electrode of the further electronic switch means, the power source comprises a battery having a positive terminal connected as a reference potential of the electronic switch means and a negative terminal connected as a reference potential of the further electronic switch means so that current flows as turn-on current from the positive terminal of the battery through the control element of the electronic switch means, through the touch control switch means and the control element of the further electronic switch means back to the battery.

14. A control signal transmitter as described in claim 5, wherein one of each pair of electrodes is connected to form a common electrode.

15. A control signal transmitter as described in claim 14, wherein the common electrode is connected to a shield for at least a portion of the control signal transmitter.

16. A control signal transmitter as described in claim 4, wherein the power source is a battery for providing control and operating voltage for the electronic switch means.

17. A control signal transmitter as described in claim 4, including three control elements associated with the control signal generating means and eight touch control switch means for selecting one of eight predetermined frequencies, and a diode matrix for connecting the touch control switch means to the control inputs of the electronic switch means and the further electronic switch means so that different predetermined combination of control elements will be connected to the control signal generating means when each touch control switch means is touched.

* * * * *

UNITED STATES PATENT OFFICE

CERTIFICATE OF CORRECTION

PATENT NO. : 3,869,671

DATED : March 4, 1975

INVENTOR(S) : W. Schroder

It is certified that error appears in the above-identified patent and that said Letters Patent are hereby corrected as shown below:

On the front page, delete the figure and insert the drawing of Figure 1, as shown on the attached sheet.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*